Patented Sept. 11, 1928.

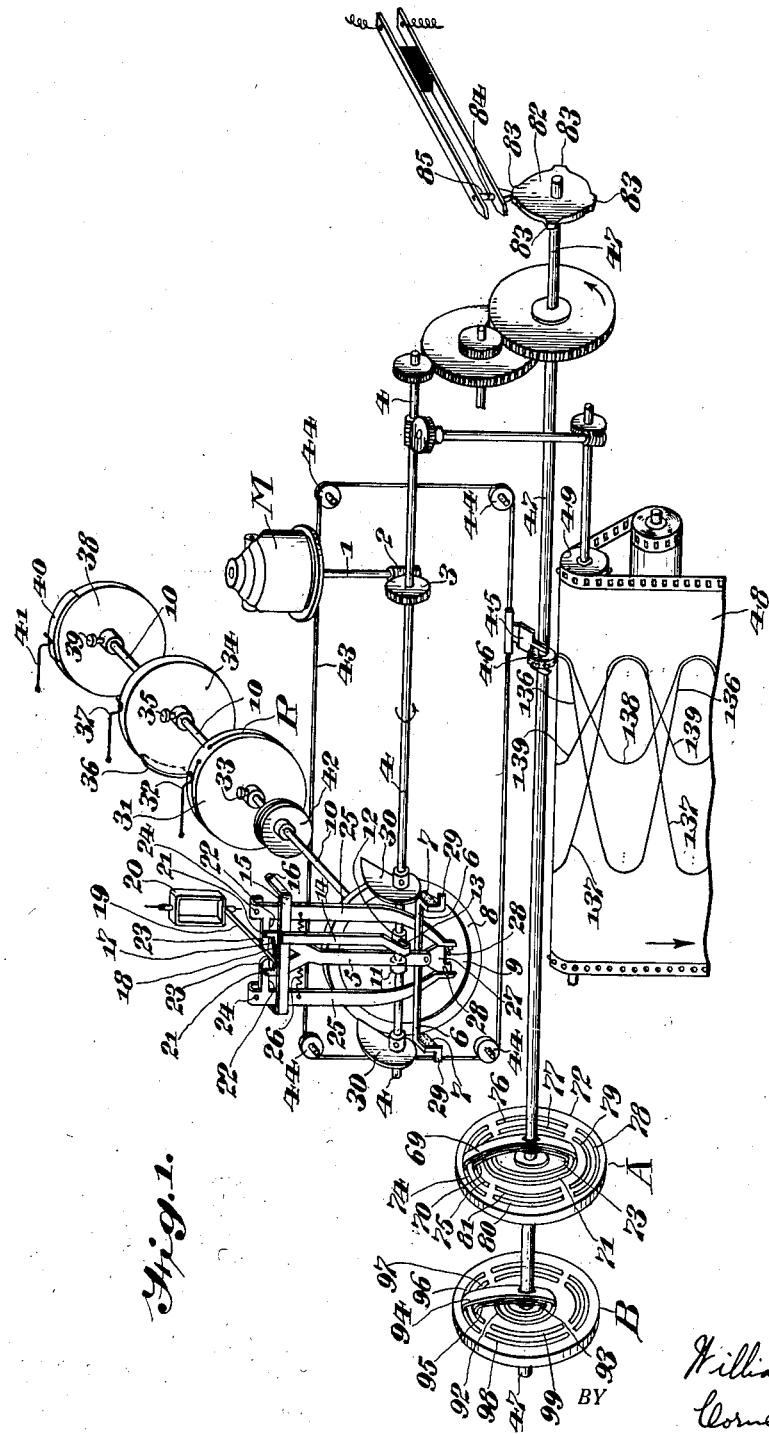

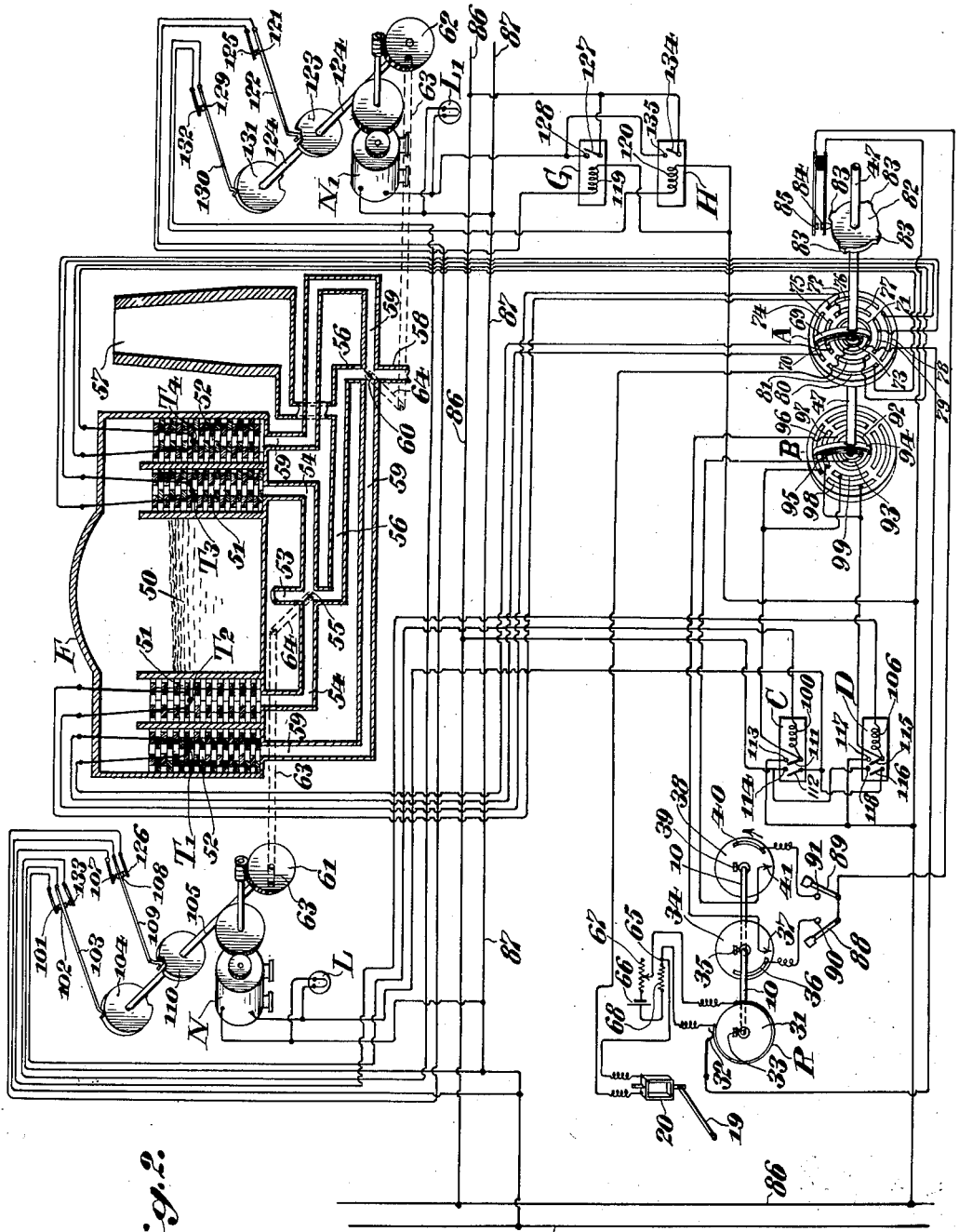

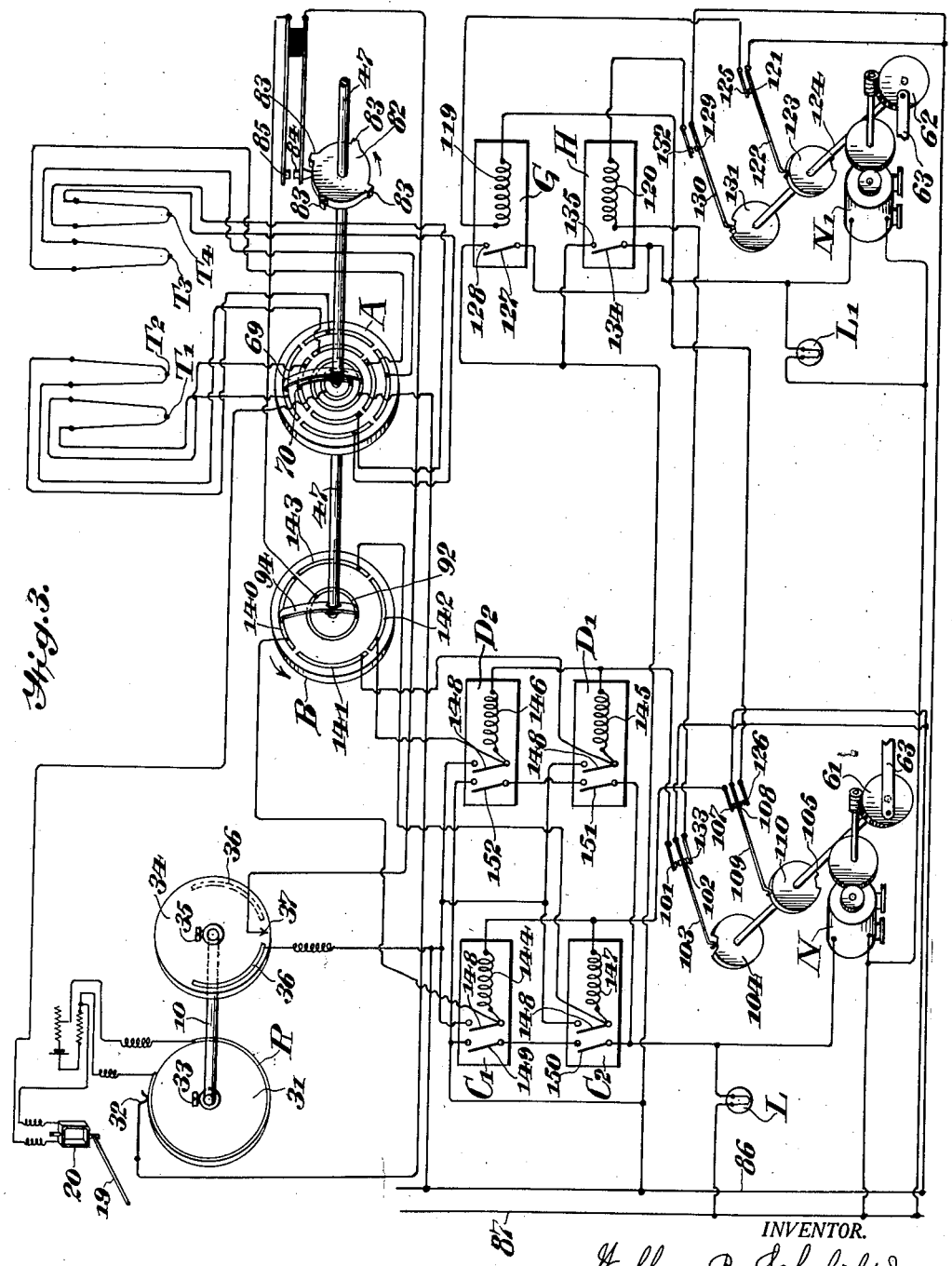

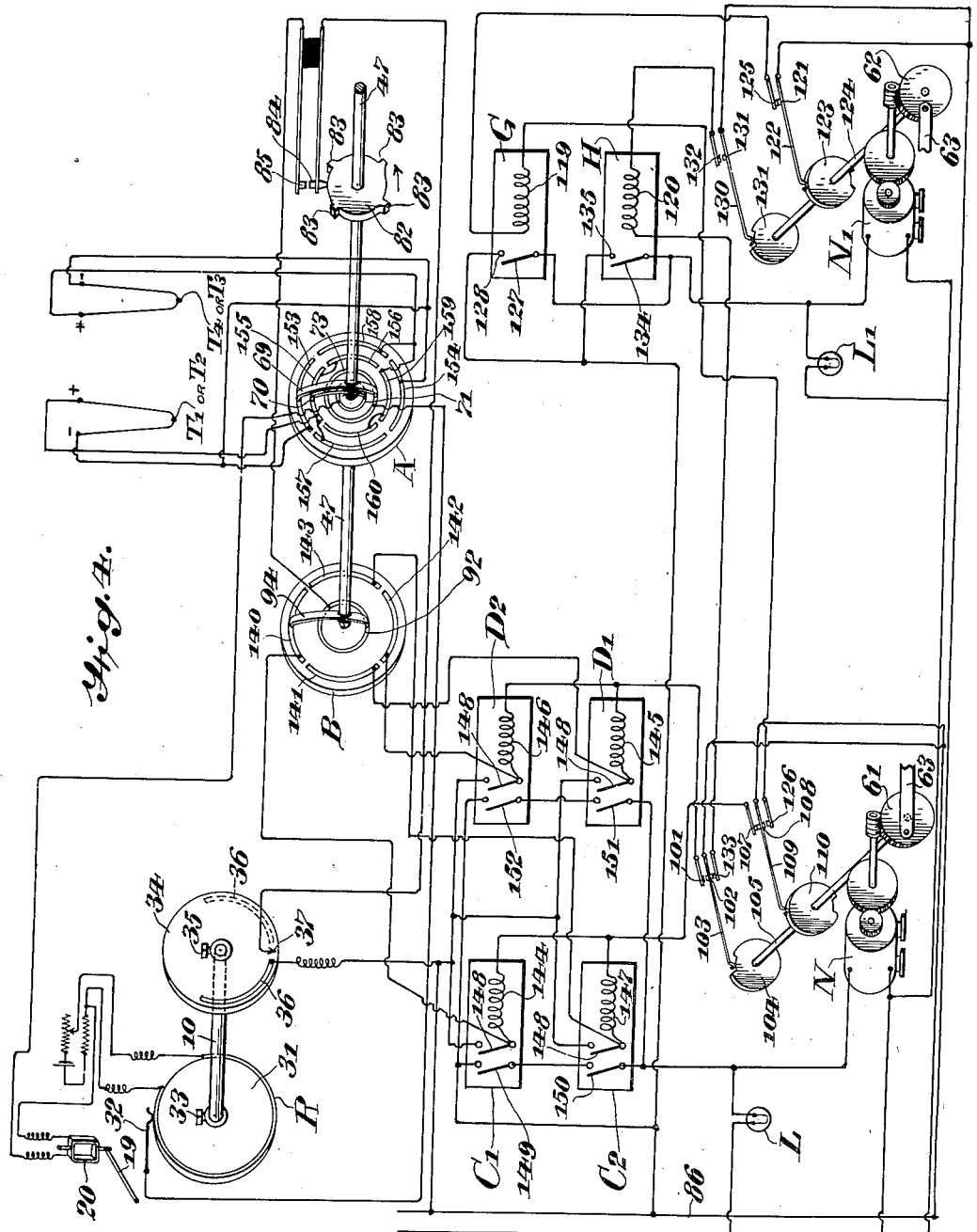

1,683,809

UNITED STATES PATENT OFFICE.

WILLIAM R. SCHOFIELD, JR., OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

CONTROL SYSTEM.

Application filed May 10, 1924. Serial No. 712,199.

My invention relates to a system of multiple control, whereby in response to predetermined changes in or differences between the magnitudes of a plurality of conditions, or in response to attainment of predetermined magnitudes of a plurality of conditions, as thermal, electrical, mechanical, physical or chemical, a plurality of controls is effected; and more particularly whereby there is effected in response to change of magnitude of one condition a control which causes a change of magnitude of another of the conditions in response to which, in turn, a further control is effected.

My invention relates also to a system of multiple control in which the controls are those of the application of an agent or agents causing the changes in said conditions, in which there is effected change in the application of an agent or agents from one region to another, or in which one agent is interchanged for another.

More particularly my invention relates to the control of regenerative furnaces characterized by the fact that in response to change in temperature, or upon attainment of predetermined temperature or predetermined relation between magnitudes of temperature, in different portions of the furnace, the air and fuel valves are controlled to effect a change as regards the portion or region of the furnace to or through which the air and fuel are supplied, or to effect a reversal of action as between the heating and regenerative portions of the furnace.

In accordance with my invention, a device responsive to the magnitude of a condition effects a control causing a change in the magnitude of a condition in response to which a second device effects a control which affects the magnitude of the condition to which the first named device responds.

Further in accordance with my invention, a plurality of devices responsive to the magnitudes of a plurality of conditions co-act in effecting a control which affects the magnitudes of a plurality of conditions to which a plurality of other devices respond to effect a control which affects the magnitudes of the conditions to which the first named devices respond.

Further in accordance with my invention, a plurality of devices, responsive to magnitudes of a plurality of conditions, operate successively and/or simultaneously and differentially to effect a control which affects the conditions to which said devices are responsive to cause a reversal of the control.

My invention resides in a method and apparatus of the character hereinafter described and claimed.

For an understanding of my method, and for an illustration of some of the various forms my apparatus may take, reference is to be had to the accompanying drawings, in which:

Fig. 1 is an elemental perspective view of apparatus utilizable in accordance with my invention.

Fig. 2 is a view of a regenerative furnace and a diagram of electrical circuits and devices utilized in its control.

Figs. 3 and 4 are diagrammatic views of modified circuit arrangements utilizable in accordance with my invention.

For the practice of my invention, any suitable type of control apparatus may be utilized, particularly one controlled by a deflecting galvanometer or any other instrument, mechanical or electrical, which deflects in response to changes in a condition to be controlled.

In the example illustrated in Fig. 1, the control apparatus is in general similar to the mechanism of Leeds Patent No. 1,125,699, January 19, 1915.

The source of power M, as an electric motor, continuously rotates the shaft 1 upon which is secured the worm 2 which drives the gear 3 secured upon the shaft 4. Upon the arm 5, mounted upon pivots, not shown, is pivoted the arm 6, on each end of which is carried a shoe 7, of cork or equivalent material, frictionally engaging the rim 8 of the clutch disk 9 secured upon the shaft 10. A cam 11, secured upon the shaft 4, periodically moves the lever 5 outwardly away from the disk 9 in opposition to a spring, not shown, thereby lifting the shoes 7 free from the rim 8, and after predetermined rotation of cam 11 the lever 5 is returned to normal position, bringing the shoes 7 again into engagement with the rim 8. A second cam 12, secured upon the shaft 4, actuates the end of finger 13, upon the lower end of the arm 14, when the shoes 7 are free of the rim 8. The arm 14 is secured at its upper end to the member 15, pivoted at 16. Secured upon the member 15 is the member 17, whose upper edge 18 is inclined upwardly and outwardly from the center. Disposed immediately above the edge 18 and normally swinging free thereof is the needle or pointer 19, of any suitable deflecting instrument, such as a galvanometer whose movable element or coil 20 deflects the member 19. The abutments 21 on member 17 limit the deflection of the needle 19. Above the needle 19 and beneath which it normally freely swings are the preferably straight and horizontal edges 22 of the members 23, pivoted, respectively, at 24. The members 23 extend toward each other and are separated by a gap at their inner ends of sufficient width to allow free entry of the needle 19 when in balanced or zero position. The members 23 have the downwardly extending arms 25, biased toward each other by the spring 26. Attached to the lower end of the arm 5 is the plate 27 carrying the pins 28 co-operating with the lower ends of the members 25. On opposite ends of the arm 6 are the lugs 29 adapted to be engaged, when the arm 6 has been deflected from its normal horizontal position, by either of the members 25, by the cams 30 secured upon the shaft 4.

As described in the aforesaid Letters Patent, when the galvanometer needle 19 deflects in one direction from its mid or zero position indicated, it is periodically clamped between the lower edge 22 of one of the members 23, under which it has deflected, and an edge 18 of the member 17, thereby deflecting the member 6, when the arm 5 has been moved outwardly by the cam 11, to an extent corresponding with the extent of deflection of the needle 19. Immediately thereafter the shoes 7 come into engagement with the rim 8 of disk 9, and thereafter one of the cams 30 engages one of the lugs 29, restoring lever 6 to its normal position indicated, and thereby carrying around with it the disk 9 and the thereto attached shaft 10 and the parts connected thereto. Similarly, deflection of needle 19 in opposite direction effects movement of the shaft 10 in opposite direction and to an extent corresponding to the extent of deflection of the needle 19.

Secured upon the shaft 10 is a disk 31, of insulating material, carrying upon its periphery the resistance conductor R, with which co-acts the stationary brush or contact 32. The disk 31 may be secured in any suitable angular position with respect to the shaft 10 by the set screw 33.

Secured upon the shaft 10 is a second disk 34, secured in any suitable angular position by the set screw 35, and carrying a contact segment 36, with which co-acts a stationary brush or contact 37. Secured upon the shaft 10 is a third disk 38, secured in any suitable angular position upon the shaft 10 by the set screw 39, and carrying the contact segment 40, with which co-acts the stationary brush or contact 41.

Secured upon the shaft 10 is the pulley 42, around which is wrapped the cord 43, passing over idler pulleys 44 and secured to the carriage 45, in which is pivoted the recorder type wheel 46, bearing a suitable number of circumferentially spaced type characters, and continuously rotated by the shaft 47 driven through suitable gearing from the shaft 4. A record sheet 48 is continuously advanced by the roller 49, continuously driven by the shaft 4, and the type wheel 46 is periodically depressed against the record sheet 48, by mechanism well understood in the art and not herein shown.

Referring to Fig. 2, F represents a regenerative furnace having the tank 50, in which glass or other material to be heated is contained. To either side of the tank 50 is a pair of regenerative chambers 51 and 52, each containing checker brick, as well understood in the art, one chamber of each pair, as 51, being traversed by the incoming fuel, as gas, and the other chamber, as 52, being traversed by incoming air. Gas is supplied through the pipe 53, with which communicate the branch gas pipes 54, communicating with the gas chambers 51. The branch pipes 54 are brought alternately into communication with the supply pipe 53 by suitable control of the gas valve 55, which also controls communication between the branch pipes 54 and the flue 56 permanently in communication with the stack or chimney 57. Air is supplied under pressure through the air supply pipe 58, with which communicate the branch air pipes 59, the valve 60 serving to control admission of air to one or the other of the air chambers 52.

In the position of the valves 55 and 60 indicated, gas is delivered to the right hand gas chamber 51 and air is delivered to the right hand air chamber 52, while the pipe 54 communicating with the left hand gas chamber 51 is in communication with the stack 57, as is also the pipe 59 connecting with the left hand air chamber 52. Upon reversal of position of the valves 55 and 60, gas and air are delivered to the left hand gas and air chambers 51 and 52, and the pipes 54 and 59 connecting with the right hand gas and air chambers connect with the stack 57.

In the operation of regenerative furnaces the valves 55 and 60 are ordinarily operated manually, and are generally reversed or operated after predetermined intervals.

In accordance with my invention, however, the valves 55 and 60 are operated, preferably automatically, in response to temperature conditions in one or more of the gas and air regenerative chambers.

For automatic operation of the valves 55 and 60 I provide any suitable motive devices, such as electric motors N and $N^1$, which when energized drive, through suitable reducing gearing, the wheels 61 and 62, respectively, to each of which is pivoted a connecting rod 63 pivoted in turn to the valve-operating arm or lever 64. Notwithstanding rotation of the wheels 61 and 62 always in the same direction, the valve-operating arms or levers 64 are moved in opposite directions to effect reversals of the valves 55 and 60. It will be understood, however, that reversible motors may be employed, as well understood in the art of control by electric motors, for effecting reversals of the valves 55 and 60.

Suitably positioned to be subjected or responsive to the temperatures in the air and gas regenerative chambers are the thermo-couples or equivalent temperature-responsive devices $T^1$, $T^2$, $T^3$ and $T^4$, which are brought in succession into a circuit of any suitable type, as in series with the galvanometer coil 20 in a branch or circuit connected to the points 32 and 65 of a potentiometer circuit including the source of current or battery 66, adjustable resistance 67, the aforesaid resistance R, and resistance 68.

To bring the aforesaid temperature-responsive devices in succession into relation with the galvanometer and its circuit, there is provided the switch A, Figs. 1 and 2, comprising the rotatable brushes 69 and 70, insulated from each other and from the shaft 47, which rotates them. The inner end of the brush 69 contacts with the circumferentially continuous stationary contact 71, carried by the stationary insulating disk 72 and connected with the aforesaid contact 32. The inner end of the brush 70 engages the circumferentially continuous contact 73, which connects with one terminal of the galvanometer coil 20. The terminals of the thermo-couple $T^1$ connect, respectively, with the arcuate switch segments 74 and 75, with which engage, respectively, the outer ends of the brushes 69 and 70. The terminals of the thermo-junction $T^2$ connect with the arcuate switch segments 76 and 77, with which co-act, respectively, the outer ends of the brushes 69 and 70. The terminals of the thermo-junction $T^3$ connect with the arcuate switch segments 78 and 79, with which co-act, respectively, the brushes 69 and 70; and the terminals of the thermo-junction $T^4$ connect with the arcuate switch contacts 80 and 81, with which engage, respectively, the brushes 69 and 70.

Secured upon the shaft 47 is a cam 82 having the four high points 83 for moving the contact 84 into engagement with contact 85 for a short time just as the outer ends of the brushes 69 and 70 are leaving a pair of contacts of the switch A, whereby the conductor 86, of a current supply circuit 86, 87, is for a short time brought into communication with the manually operated switches 88 and 89 just as one of the thermo-couples is removed from the circuit of the galvanometer coil 20.

The switch arms 88 and 89 are adapted to connect, respectively, with the terminals 90 and 91, connected, respectively, with the aforesaid contacts 36 and 40 actuated by the shaft 10. The brushes 37 and 41 connect, respectively, with the circumferentially continuous stationary contact rings 92 and 93 of the relay selecting switch B comprising the brushes 94 and 95 insulated from each other and from the shaft 47 and rotated by the shaft 47. The inner ends of the brushes 94 and 95 engage, respectively, with the contacts 92 and 93, and their outer ends co-act with two pairs of arcuate contacts 96, 97 and 98, 99. The contacts 96 and 99 are connected to each other, and the contacts 97 and 98 are connected to each other. The contacts 96 and 99 connect to one terminal of the winding 100 of the relay C. The other terminal of the winding 100 connects to the contact 101, with which co-acts the contact 102 upon the pivoted arm 103 controlled by the cam 104 secured upon the shaft 105 driven by the aforesaid wheel 61. The contact 102 connects with the other supply circuit conductor 87. Similarly, the contacts 97 and 98 connect with one terminal of the winding 106 of the relay D, and the other terminal of the winding 106 connects to the contact 107, with which co-acts the movable contact 108 carried by the pivoted lever 109 controlled by the cam 110 secured upon the shaft 105. The contact 108 is connected to the supply circuit conductor 87.

The relay winding 100, when energized, moves the relay tongues 111 and 112 toward the right, Fig. 2, in opposition to a spring, not shown, into engagement, respectively, with the terminals 113 and 114. Similarly, the winding 106 when energized moves the tongues 115 and 116, in opposition to a spring, not shown, into engagement with the terminals 117 and 118, respectively. The contacts 113 and 117 are connected to the conductor 86, whereby, after the windings 100 and 106 are temporarily energized under the control of the contacts 84 and 85, they bring their tongues 111 and 115 into engagement with contacts 113 and 117, thereby retaining the windings 100 and 106 energized, notwithstanding separation of contacts 84 and 85, thus holding the tongues 112 and 116 in engagement with their contacts 114 and 118, respectively, until the coils 100 and 106 are de-energized by separation of contacts 102 and 108 from their aforesaid co-acting contacts 101 and 107, this operation of the contacts 102 and 108 being successive as determined by the low surfaces of their control cams 104 and 110. The motor N is energized when either of the relay tongues 112 or 116 is in circuit closing position. Upon energization of the motor N it drives the shaft 105 through the reducing gearing indicated until that shaft has rotated through 180 degrees, whereupon the circuit of the winding of one or the other of the relays C and D is opened by separation of contact 102 from contact 101 or by separation of contact 108 from contact 107, thereby deenergizing the associated relay and opening the motor circuit. In other words, the motor in successive energizations rotates the shaft 105 through 180 degrees for each energization, and each energization effects movement of the valve 55 from its one to its other position.

The motor $N^1$, which operates the valve 60, is controlled by either of the relays G and H. One terminal of the winding 119 of relay G and one terminal of the winding 120 of relay H are connected to the supply conductor 86. The other terminal of winding 119 is connected to the contact 121 carried by the pivoted lever 122 controlled by the cam 123 secured upon the shaft 124 of the wheel 62. The contact 121 co-acts with the stationary contact 125 connected with the stationary contact 126 co-acting with the aforesaid contact 108 controlled by motor N, the circuit continuing through the contacts 126 and 108 to the supply conductor 87, wherefore when contacts 121, 125 and 126, 108 are in engagement with each other the winding 119 is energized, drawing the relay tongue 127, in opposition to a spring, not shown, into engagement with the contact 128, causing energization of the motor $N^1$ from the supply conductors 86, 87. Similarly, the other terminal of the relay winding 120 connects with the movable contact 129 carried by the pivoted lever 130 controlled by the cam 131 secured upon the aforesaid shaft 124. The contact 129 co-acts with the stationary contact 132 connected with the stationary contact 133 co-acting with the movable contact 102 controlled by the motor N. When the contacts 129, 132 and 133, 102 are in engagement with each other, the winding 120 is energized, causing attraction of the relay tongue 134, in opposition to a spring, not shown, into engagement with the contact 135, thereby energizing the motor $N^1$ from the conductors 86, 87. For each energization of the motor $N^1$, the shaft 124 is rotated through 180 degrees, whereupon the motor is deenergized because of separation of contact 121 from contact 125, or 129 from 132, thereby deenergizing the associated relay, and opening the motor circuit. Each energization of the motor $N^1$ effects movement of the valve 60 from its one position to its other.

It is accordingly characteristic of the motor controls described that the motor $N^1$ is in effect under the control of the motor N. It is preferred further, in accord with preferred regenerative furnace practice, that the air-controlling valve 60 shall be shifted or moved after the gas-control valve 55 is actuated. This sequence of operation is possible with the controls described in that the motor $N^1$ is not energized until an appreciable time after energization of the motor N, or, in fact, until deenergization of the motor N.

However, if it be desirable that the two motors N and $N^1$ be simultaneously controlled and energized, the motor $N^1$ need simply be connected in parallel with the motor N, whereupon the relays G, H, the switches 121, 125 and 129, 132, and contacts 107 and 126 may be omitted.

The operation is as follows:

With the valves 55 and 60 in the position indicated in Fig. 2, gas and air are passing through the right hand regenerative chambers 51 and 52, respectively, through the checker work therein, absorbing heat therefrom, and effecting combustion above the tank or puddle 50, and the products of combustion pass through the left hand chambers 51 and 52 to the stack 57, thereby delivering heat to the checker works in the left hand regenerative chambers.

During these operations the four thermo-couples partake of the temperatures of the chambers in which they are located. The temperatures of the couples $T^1$ and $T^2$ are rising, while the temperatures of couples $T^3$ and $T^4$ are falling. The four couples are brought in succession, by the switch A, into circuit with the galvanometer coil 20 and the associated potentiometer, causing the needle 19 to effect movements of the shaft 10 of the recorder and controlling mechanism to extents and positions corresponding with the temperatures of the several couples. As each couple is brought into circuit with the galvanometer coil 20, the type wheel 46, bearing a type character for each thermo-couple, is brought to printing position with respect to the record paper 48, and when a balance is obtained the type wheel is pressed against the paper 48, by the depressing mechanism hereinbefore referred to. Thereafter the same operation is produced under the control of each of the remaining thermo-couples in succession, whereby there is produced upon the sheet 48 four records, one for each thermo-couple. These records are indicated, by way of example merely, by the lines 136, 137, 138 and 139, made under the controls, respectively, of thermo-couples $T^1$, $T^4$, $T^2$ and $T^3$. The records 136 and 137 generally show greater amplitudes of temperature variation as occurring in the regenerative chambers traversed by air, and the curved records 138 and 139 are generally of lesser amplitude in correspondence with the lesser degree of changes of temperature of the couples $T^2$ and $T^3$ located in the regenerative chambers traversed in succession by gas.

The high and low points or changes of inflection of the four records occur in accord with reversals of the valves 55 and 60.

When the shaft 10 of the recorder and control mechanism is under the control of either of the couples T¹ and T⁴ (though if preferred it may be when under the control of couples T² and T³), the valve control mechanism is controlled. That is to say, the valves 55 and 60 are controlled by those thermocouples which are located in the air regenerative chambers, though if desired the valve mechanism may be controlled by those thermocouples which are located in the gas regenerative chambers.

With the valves 55 and 60 in the position indicated, and with the switch 88 in engagement with the contact 90, and with the relay selecting switch B in the position indicated in Fig. 2, the valves will be reversed when the thermo-couple T¹ reaches a temperature so high that the contact 36 on disk 34 is rotated to position engaging the brush 37, whereupon the relay C will be energized, first for a short period through contacts 84, 85 and then continue to be energized through tongue 111, thereby energizing the motor N, which will then rotate the wheel 61 and shaft 105 through 180 degrees, causing a reversal of the valve 55, the motor being deenergized, as hereinbefore described, at the completion of a half revolution of shaft 105.

Upon deenergization of the motor N, the motor N¹ will be energized, as hereinbefore described, rotating the wheel 62 and shaft 124 through 180 degrees, causing reversal of valve 60, and deenergization of the motor N¹.

Now, with the valves so reversed, the gas and air are delivered through the now highly heated checker works in the left hand regenerative chambers 51 and 52, and the products of combustion pass through the checker works in the right hand chambers 51 and 52 to the stack 57, the temperatures in the chambers 51 and 52 at the left thereafter falling, while the temperatures in the chambers 51 and 52 at the right increase. The control mechanism is now under the control of the thermo-couple T⁴, which causes the movement of the shaft 10 to such extent and to such position that when the temperature in right chamber 52 attains the predetermined desired high magnitude the contact 36 will again come into engagement with the brush 37, and, because of the now new position of the switch B, will cause energization of the relay D, first temporarily through the contacts 84 and 85, and then continued through the tongue 115, to cause energization of the motor N, which as before will reverse the valve 55, and upon completion of this reversing movement will cause energization of the motor N¹, which will then reverse the valve 60, and then become deenergized.

Accordingly, in response to attainment of predetermined high temperature, in the left and right chambers 52, in succession, the gas and air valves will be reversed.

With the switch 88 open, and switch 89 closed upon its contact 91, and with the valves 55 and 60 in the position shown, the apparatus is under the control of the couple T⁴, which, when the temperature in the right hand chamber 52 falls to a predetermined magnitude, will cause the contact 40, on disk 38, to engage brush 41, causing energization of relay C through the switch B, which for this purpose will be in such position that the brushes 94 and 95 are in engagement with segments 98 and 99, and through the contacts 84, 85 temporarily, and then continuously through the tongue 111, causing energization of the motor N, which then reverses the valve 55 and then causes energization of the motor N¹, which reverses valve 60 and becomes deenergized. After this reversal the thermocouple T¹ then assumes control and operates on reaching predetermined low temperature to control the relay D, to cause energization of the motors N and N¹, in succession, as described, again reversing the valves.

Accordingly, with the switch 89 in the position stated, the control is effected in response to predetermined low temperatures in the air regenerative chambers 52.

When both switches 88 and 89 are closed upon their contacts 90 and 91, respectively, the apparatus is under the control of couples T¹ and T⁴ at all times, that is, simultaneously, and not successively. With the valves 55 and 60 in the position illustrated in Fig. 2, couple T¹ is rising in temperature and couple T⁴ is falling in temperature. In case the couple T¹ attains the predetermined high temperature before the couple T⁴ falls to a predetermined low temperature, the motor N will be energized under control of relay C, causing a reversal of the valve 55, and thereafter, as before described, a reversal of the valve 60 by motor N¹. If, on the other hand, the couple T⁴ reaches a predetermined low temperature before the couple T¹ attains a predetermined high temperature, the motor N under control of the relay C will effect reversal of valve 55 and thereafter reversal of valve 60 by motor N¹. After such reversal of the valves 55 and 60 the operation will be the same as described, except that the motor N will be controlled through the relay D either when the couple T¹ attains a predetermined low temperature before the couple T⁴ attains a predetermined high temperature, or vice versa.

It will be understood, of course, that throughout the various characters of control hereinbefore described records are made of the temperatures attained by the four thermo-couples. It will further be understood that the recording feature may be entirely omitted if desired, or records made of the temperatures of less than all of the thermo-couples, as may be desired.

Referring to Fig. 3, there is shown diagrammatically a modified system of control, utilizable for various purposes, including the control of a regenerative furnace as in Fig. 2.

In this case again the couples $T^1$, $T^2$, $T^3$ and $T^4$ are assumed to be located as indicated in Fig. 2 in the several regenerative chambers. The couples $T^1$ and $T^2$ co-act, successively, in effecting reversal of the valves 55 and 60 either when both attain predetermined high or predetermined low temperatures, which temperatures may be of the same or different magnitudes. Movement of the valves in opposite direction is controlled by the couples $T^3$ and $T^4$, co-acting, successively, either when they attain predetermined high or predetermined low temperatures, which temperatures may be either of the same or different magnitudes.

In general, the control circuits are similar to those shown in Fig. 2, particularly in that the motor $N^1$ is controlled by or through the motor N, the switch A brings the four thermo-couples in succession into circuit with the galvanometer coil 20, and the switch 84, 85 effects temporary energization of relays. Switch B, however, is of modified structure, and there are employed individual relays, controlled by switch B, for the four thermocouples. The four relays $C^1$, $C^2$, $D^2$ and $D^1$ are controlled, respectively, by the thermocouples $T^1$, $T^2$, $T^3$ and $T^4$.

The switch B in this instance has a single brush 94, whose one end contacts with the circumferentially continuous switch contact 92 and whose outer end co-acts in succession with the contacts 140, 141, 142 and 143. As before, the contact 92 connects through the switch 84, 85 with the supply circuit conductor 86 through the contact 36 and brush 37 associated with the disk 34 on shaft 10. The contacts 140—143 connect, respectively, with a terminal of each of the relay windings 144, 145, 146 and 147, respectively. The remaining terminals of the windings 145 and 146 connect through the contacts 101 and 102 with the other supply circuit conductor 87; and the remaining terminals of the windings 144 and 147 connect through the contacts 107 and 108 with the conductor 87. Each of the relays is provided with two tongues, attracted in opposition to springs, not shown, into engagement with co-operating contacts. The tongues 148 effect, like tongues 111 and 115, Fig. 2, continuation of the energization of their respective relay coils after opening of the switch 84, 85. The tongues 149 and 150 of relays $C^1$ and $C^2$ are in series with each other, whereby when both are in circuit closing position the motor N is energized. Similarly, the tongues 151 and 152 of relays $D^1$ and $D^2$ are in series with each other, whereby when both are in circuit closing position the motor N will be energized.

The operation is as follows:

Assuming that the valves 55 and 60 are in the position indicated in Fig. 2, the couples $T^1$ and $T^2$ are rising in temperature, and couples $T^3$ and $T^4$ are falling in temperature. When the couple $T^1$ is in circuit through the switch A, and attains a predetermined high temperature, the disk 34 will have been rotated to bring contact 36 into engagement with brush 37, thereby causing energization of the winding 144 first temporarily through the switch 84, 85, and then held energized by the now attracted tongue 148, through contacts 107 and 108. The circuit of the motor N is not yet complete, but will be completed upon movement of the switch A to position to bring couple $T^2$ into circuit, and when it attains a predetermined high temperature contact 36 will again come into or remain in engagement with the brush 37, and the brush 94 will have been shifted into engagement with contact 143, causing energization of the relay winding 147, first temporarily through switch 84, 85 and then continuing, due to attraction of the corresponding tongue 148, through the contacts 107 and 108. The energization of winding 147 will cause closure of circuit by the tongue 150, and since the tongue 149 has remained in circuit closing position due to continuance of energization of winding 144, the motor N will be energized, causing reversal of valve 55, and subsequently energizing motor $N^1$, which then reverses valve 60, Though in the above description it has been assumed that the couple $T^1$ first attains the predetermined high temperature, it may occur that couple $T^2$ first attains high temperature, but in either case the action is of the character described, and not until both relay tongues 149 and 150 are in circuit closing position will the motors N and $N^1$ be energized. After reversal of the valves 55 and 60 the control is shifted to the couples $T^3$ and $T^4$ at the other end of the furnace. The action, however, is similar in that the couples $T^3$ and $T^4$ come successively into circuit with the galvanometer coil 20 and the relay windings 146 and 145 will both sooner or later be energized and continue to be energized, causing the tongues 151 and 152 to be simultaneously in circuit closing position, to effect energization of motors N and $N^1$. Again it is a matter of indifference which of the couples $T^3$ and $T^4$ first attains the predetermined high temperatures.

While the above described control has been assumed to be in response to attainment of predetermined high temperatures, it may obviously be in response to attainment of predetermined low temperatures, and for this purpose it is simply necessary to shift the contact 36 on disk 34 to position indicated in dotted lines at the right of disk 34.

Referring to Fig. 4, there is illustrated a modified control system involving the operation of temperature-responsive devices, such as thermo-couples, simultaneously in circuit and producing a joint effect, particularly a differential effect, in response to which a control is effected. It is further characteristic of the example illustrated that the temperature-responsive devices, such as thermocouples, are utilized separately and jointly in effecting desired controls.

The arrangement of Fig. 4 is in general similar to the arrangements of Figs. 2 and 3. In this instance, however, two thermocouples are employed for control purposes, and both located either in air regenerative chambers or gas regenerative chambers, as may be desired; or one in either air chamber and the other in either gas chamber.

The switch A is of a character effecting the connection of the two thermo-couples, as $T^1$ and $T^4$, in succession with the galvanometer coil 20, and alternately connecting them in series with each other, and in such relation that their electro-motive-forces oppose each other. For this purpose the negative terminal of the couple $T^1$ is connected to the diametrically opposed switch terminals 153 and 154, while its positive terminal is connected to the two neighboring switch contacts 155 and 156 and to the contact 157. The positive terminal of the couple $T^4$ is connected with the contacts 158, 159 and 160, while the negative terminal of the couple is connected to the negative terminal of the couple $T^1$ and the corresponding switch contacts. In the position of the switch A indicated in Fig. 4, couple $T^1$ alone is in circuit with the galvanometer coil 20 for purposes of recording the temperature to which that couple is subjected. When the switch contacts 69 and 70 are in engagement with the contacts 157 and 160, the two couples $T^1$ and $T^4$ are in series with each other, but opposed, whereby there is impressed upon the circuit of the galvanometer coil 20 an electro-motive-force which is the difference between the electro-motive-forces developed by these forces and representative of the difference of temperatures in the two chambers in which the couples $T^1$ and $T^4$ are disposed. In the next position of the switch contacts 69 and 70, when they are in engagement with the contacts 154 and 159, the couple $T^4$ alone is in circuit and effects the production of a record. And in the fourth position of the contacts 69 and 70 in engagement with contacts 158 and 156 the couples $T^1$ and $T^4$ are again in series with each other, and opposed, but their sense of connection in the galvanometer coil circuit is relatively reversed, so that the current due to the difference in their electro-motive-forces will flow in the same direction through the galvanometer coil 20 as before. The type wheel 46, Fig. 1, under these circumstances again produces four records, two for the couples $T^1$ and $T^4$ when separately in circuit, and two further records when they are in circuit and opposed to each other.

With the valves 55 and 60 in the position indicated in Fig. 2 and the contacts 69 and 70 of switch A in engagement with contacts 158 and 156, the couples $T^1$ and $T^2$ are in series with each other and opposed. The temperature of the couple $T^1$ is rising, while the temperature of couple $T^4$ is falling. At first there is impressed upon the circuit of the coil 20 an electro-motive-force whose direction is such as to cause deflection of needle 19 in such direction as to effect rotation of the shaft 10 in direction corresponding with falling temperature. As the temperature of couple $T^1$ increases, its electro-motive-force increases, and as the temperature of couple $T^4$ decreases its electro-motive-force decreases until eventually the electro-motive-force of couple $T^1$ exceeds that of couple $T^4$, whereupon the effective electro-motive-force impressed upon the circuit of coil 20 is in the reverse sense to that described, causing the shaft 10 to be adjusted in direction corresponding with rising temperature, and eventually the contact 36 will engage brush 37 when the difference between the temperatures to which couples $T^1$ and $T^2$ are subjected attains a predetermined magnitude, whereupon a relay $C^2$ will be energized, first temporarily through switch 84, 85, and then continuously due to attraction of the tongue 148. Accordingly, the tongue 150 is brought to and remains in circuit closing position, but motor N is not yet energized. Thereafter the contacts 69 and 70 of switch A take the position indicated in Fig. 4, in which case the couple $T^1$ alone is in circuit, and when it attains a predetermined high temperature relay $C^1$ will be energized, closing circuit at tongue 149, and thereby energizing the motors N and $N^1$, causing reversal of the valves 55 and 60. Accordingly, the operation of the valves is not effected until the existence of two conditions, one of them a predetermined high temperature in one of the furnace chambers and the other a predetermined temperature difference in the air (or gas) regenerative chambers at opposite ends of the furnace.

Similarly, when the switch contacts 69 and 70 are next in engagement with contacts 157 and 160, the couples $T^1$ and $T^4$ are again in series with each other and opposing, and when the electro-motive-force of couple $T^4$ predominates over that of couple $T^1$, the relay $D^1$ will be energized, bringing its tongue 151 to circuit closing position, without, however, effecting a control of the motors. Thereafter, when contacts 69 and 70 are in engagement with contacts 154 and 159, couple $T^4$ alone is in circuit, and when it attains a predetermined high temperature relay $D^2$ is energized, completing the motor control circuit by tongue 152, whereupon the motors N and $N^1$ in succession reverse their respective valves 55 and 60. Here again the reversal has been in response to two conditions, first, a predetermined difference in temperature in the air (or gas) chambers at the opposite ends of the furnace, and secondly, a predetermined high temperature in the air (or gas) regenerative chamber at the right end of the furnace F, Fig. 2.

While in the above description it has been assumed that the control is determined by attainment of predetermined high temperature, it may be effected also by attainment of predetermined low temperature, in which case the contact 36 may be shifted to the right side of the disk 34, as indicated in dotted lines.

With control systems of the character hereinbefore described there may be associated suitable indicating means to indicate the conditions obtaining in the furnace.

For example, in shunt with the motors N and N¹ may be connected indicators or signals, for example, incandescent lamps L and L¹, each of which glows whenever its associated motor is energized, indicating that the corresponding valves are about to be or should be operated. If a lamp L should glow and should not be followed by the glowing of the lamp L¹, it will indicate to an attendant that something is out of order concerning the motor N¹ or its associated control circuits. In case the lamp L glows, and continues to glow for a considerable time, it will indicate to an attendant that there is something out of order as regards the motor N or the circuits controlling it or controlled by it.

It will be understood of course that where the valves 55 and 60 are manually operated, in which case the motors are omitted, glowing of the lamp L will indicate to the operator that the time has arrived for reversing the valves.

While in the foregoing description of Fig. 2 the valve mechanism has been described as under the control of the couples T¹ and T⁴ or T² and T³, it will be understood that couples T¹ and T³, or T² and T⁴ may be utilized for the control. And while in the described operation of Fig. 4 couples T¹ and T⁴ or T² and T³ are utilized, it will be understood that T¹ and T³ or T² and T⁴ may be utilized.

What I claim is:

1. The method of controlling a regenerative furnace having regenerative chambers and valve mechanism for transferring the flow of combustion materials, which comprises intermittently effecting a control whose magnitude varies with the temperature in one of said chambers, and actuating said valve mechanism in response to said control upon attainment of predetermined temperature in said one of said chambers.

2. The method of controlling a regenerative furnace having regenerative chambers and valve mechanism for transferring the flow of combustion materials, which comprises at predetermined intervals effecting a control whose magnitude varies with the temperature in one of said chambers, and actuating said valve mechanism in response to said control upon attainment of predetermined temperature in said one of said chambers.

3. The method of controlling a regenerative furnace having regenerative chambers and valve mechanism for transferring the flow of combustion materials, which comprises intermittently producing an electric current whose magnitude varies with the temperature in one of said chambers, and controlling said valve mechanism by said current upon attainment of a magnitude corresponding with a predetermined temperature in said one of said chambers.

4. The method of controlling a regenerative furnace having regenerative chambers and valve mechanism for transferring the flow of combustion materials, which comprises intermittently producing an electric current whose magnitude varies with the temperature in one of said chambers, and actuating said valve mechanism directly in response to attainment by said current of a magnitude corresponding with a predetermined temperature in said one of said chambers.

5. The method of controlling a regenerative furnace having regenerative chambers and valve mechanism for transferring the flow of combustion materials, which comprises effecting actuation of said valve mechanism in response to variation of temperature to a predetermined low value in one of said chambers.

6. The method of controlling a regenerative furnace having regenerative chambers and valve mechanism for transferring the flow of combustion materials, which comprises effecting actuation of said valve mechanism in response to variation of temperature to a predetermined low value in one of said chambers, and thereafter reversing said valve mechanism in response to attainment of predetermined temperature in another of said chambers.

7. The method of controlling a regenerative furnace having regenerative chambers and valve mechanism for transferring the flow of combustion materials, which comprises effecting actuation of said valve mechanism in response to attainment of predetermined high or low temperature in one of said chambers in advance of attainment of predetermined low or high temperature in another of said chambers.

8. The method of controlling a regenerative furnace having regenerative chambers and valve mechanism for transferring the flow of combustion materials, which comprises effecting actuation of said valve mechanism in response to attainment of predetermined high or low temperature in one of said chambers in advance of attainment of predetermined low or high temperature in another of said chambers, and thereafter reversing said valve mechanism in response to attainment of predetermined high or low temperature in said other of said chambers in advance of attainment of predetermined low or high temperature in said one of said chambers.

9. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to attainment of predetermined temperature in one of said chambers.

10. The method of controlling a regenerative furnace having regenerative chambers and valve mechanisms for transferring, respectively, the fuel and air from one pair of said chambers to another pair, which comprises effecting actuation of the fuel valve mechanism in response to attainment of predetermined temperature in one of said chambers, and thereafter effecting actuation of the air valve mechanism.

11. The method of controlling a regenerative furnace having regenerative chambers and valve mechanisms for transferring, respectively, the fuel and air from one pair of said chambers to another pair, which comprises operating the fuel valve mechanism in response to attainment of predetermined temperature in one of said chambers, and initiating operation of the air valve mechanism at the conclusion of the operation of said fuel valve mechanism.

12. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to attainment of predetermined high temperature in one of said chambers, and thereafter reversing said fuel and air valve mechanisms in succession in response to attainment of predetermined high temperature in another of said chambers.

13. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to variation of temperature to a predetermined low value in one of said chambers.

14. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to attainment of predetermined low temperature in one of said chambers, and thereafter reversing said fuel and air valve mechanisms in succession in response to attainment of predetermined low temperature in another of said chambers.

15. The method of controlling a regenerative furnace having regenerative chambers and valve mechanisms for transferring, respectively, the fuel and air from one pair of said chambers to another pair, which comprises effecting actuation of said fuel and air valve mechanisms in succession in response to attainment of predetermined high or low temperature in one of said chambers in advance of attainment of predetermined low or high temperature in another of said chambers.

16. The method of controlling a regenerative furnace having regenerative chambers and valve mechanisms for transferring, respectively, the fuel and air from one pair of said chambers to another pair, which comprises effecting actuation of said fuel and air valve mechanisms in succession in response to attainment of predetermined high or low temperature in one of said chambers in advance of attainment of predetermined low or high temperature in another of said chambers, and thereafter reversing said fuel and air valve mechanisms in succession in response to attainment of predetermined high or low temperature in said other of said chambers in advance of attainment of predetermined low or high temperature in said one of said chambers.

17. The method of controlling a regenerative furnace having regenerative chambers and valve mechanism for transferring the flow of combustion materials, which comprises effecting operation solely of the fuel valve mechanism in response to attainment of predetermined temperature in one of said chambers, simultaneously producing a signal, and producing a second signal at the conclusion of the operation of said fuel valve mechanism.

18. The method of controlling a regenerative furnace having regenerative chambers and valve mechanism for transferring the flow of combustion materials, which comprises effecting operation solely of the fuel valve mechanism in response to attainment of predetermined temperature in one of said chambers, simultaneously producing a signal, producing a second signal at the conclusion of the operation of said fuel valve mechanism, and effecting actuation of the air valve mechanism.

19. The method of controlling a regenerative furnace having regenerative chambers and valve mechanisms for transferring, respectively, the fuel and air from one pair of said chambers to another pair, which comprises producing a signal in response to attainment of predetermined temperature in one of said chambers, and effecting actuation of said fuel and air valve mechanisms in succession.

20. The method of controlling a regenerative furnace having regenerative chambers and valve mechanisms for transferring, respectively, the fuel and air from one pair of said chambers to another pair, which comprises producing a signal in response to attainment of predetermined temperature in one of said chambers, effecting actuation of said fuel and air valve mechanisms in succession, and producing a second signal in response to actuation of said fuel valve mechanism.

21. The method of controlling a regenerative furnace having regenerative chambers and valve mechanisms for transferring, respectively, the fuel and air from one pair of said chambers to another pair, which comprises producing a signal in response to attainment of predetermined temperature in one of said chambers, effecting actuation of said fuel and air valve mechanisms in succession, and thereafter producing a signal and effecting reversal of said valve mechanisms in response to attainment of predetermined temperature in another of said chambers.

22. A control system comprising a plurality of devices each responsive to changes in the magnitude of a condition, means operating in sequence effecting alternate changes in the magnitude of said conditions between appreciable high and low limits, mechanism controlling said means, and means for effecting a control of said mechanism by said responsive devices in succession.

23. A control system comprising a plurality of devices each responsive to changes in the magnitude of a condition, means effecting in succession alternate changes in the magnitudes of said conditions between appreciable high and low limits, mechanism controlling actuation of said means by operations in sequence, and means controlling said mechanism and controlled in succession by said responsive devices throughout the period of each successive change.

24. A control system comprising a plurality of temperature-responsive devices subjected, respectively, to the temperatures in different regions, mechanisms controlling, respectively, the passage of fuel and air to said regions, and means controlled by at least one of said temperature-responsive devices in response to its attainment of predetermined temperature for actuating the mechanism controlling the passage of fuel and thereafter actuating the mechanism controlling the passage of air.

25. A control system comprising a plurality of temperature-responsive devices subjected, respectively, to the temperatures in different regions, mechanisms controlling, respectively, the passage of fuel and air to said regions, and means controlled by at least one of said temperature-responsive devices in response to its attainment of predetermined temperature for operating the mechanism controlling the passage of fuel and thereafter at the conclusion of the operation aforesaid actuating the mechanism controlling the passage of air.

26. A control system comprising a device responsive to changes in the magnitude of a condition, mechanism controlled by said responsive device and comprising a motive device and a second motive device controlled by said motive device, and means controlled by said motive devices effecting changes in the magnitude of said condition.

27. A control system comprising a device responsive to changes in the magnitude of a condition, a motive device, means controlled by said responsive device controlling energization of said motive device, means controlled by said motive device for deenergizing it after predetermined movement, a second motive device controlled by said first motive device and energized approximately at the time of deenergization of the first motive device, and means controlled by said motive devices for effecting changes in the magnitude of said condition.

28. The combination with a regenerative furnace comprising a plurality of pairs of regenerative chambers, of valve mechanism controlling transfer of flow of fuel and air from the chambers of one pair to those of another pair, temperature-responsive devices subjected respectively to the temperatures in chambers of the different pairs of chambers, and means operating in sequence controlling said valve mechanism and controlled in succession by said temperature-responsive devices in response to attainment of predetermined temperatures in said chambers.

29. The combination with a regenerative furnace comprising a plurality of pairs of regenerative chambers, of valve mechanism controlling transfer of flow of fuel and air from the chambers of one pair to those of another pair, temperature-responsive devices subjected respectively to the temperatures in chambers of the different pairs of chambers, and means controlling said valve mechanism and controlled in succession by said temperature-responsive devices in response to variation of temperatures in said chambers to predetermined low values.

30. The combination with a regenerative furnace comprising a plurality of pairs of regenerative chambers, of valve mechanisms controlling transfer of flow of fuel and air, respectively, from one pair of said chambers to another pair, temperature-responsive devices subjected respectively to the temperatures in chambers of the different pairs, a motive device for actuating the valve mechanism which controls the flow of fuel, a second motive device thereafter actuating the valve mechanism which controls the flow of air, and means controlling said motive devices and controlled by said temperature-responsive devices in succession in response to attainment of predetermined temperatures in said chambers.

31. The combination with a regenerative furnace comprising a plurality of pairs of regenerative chambers, of valve mechanisms controlling transfer of flow of fuel and air, respectively, from one pair of said chambers to another pair, temperature-responsive devices subjected respectively to the temperatures in chambers of the different pairs, a motive device for actuating the valve mechanism which controls the flow of fuel, a second motive device thereafter actuating the valve mechanism which controls the flow of air, and means controlling said motive devices and controlled by said temperature-responsive devices in succession in response to attainment of predetermined high or low temperature in one of said chambers in advance of attainment of predetermined low or high temperature in another of said chambers.

32. The combination with a deflecting member, a source of power, a movable structure, and a disengageable mechanical connection between said source of power and said movable structure controlled by said deflecting member, of a regenerative furnace comprising a plurality of pairs of regenerative chambers, mechanism controlled by said movable structure for controlling the supply of combustion materials to said chambers, and a device responsive to the temperature in one of said chambers controlling deflection of said deflecting member.

33. The combination with a deflecting member, a source of power, a movable structure, and a disengageable mechanical connection between said source of power and said movable structure controlled by said deflecting member, of a regenerative furnace comprising a plurality of pairs of regenerative chambers, mechanism controlled by said movable structure for controlling the supply of combustion materials to said chambers, and a device responsive to the temperature in one of said chambers intermittently controlling deflection of said deflecting member.

34. The combination with a deflecting member, a source of power, a movable structure, and a disengageable mechanical connection between said source of power and said movable structure controlled by said deflecting member, of a regenerative furnace having regenerative chambers and valve mechanisms for transferring, respectively, the fuel and air from one pair of said chambers to another pair, a device responsive to the temperature in one of said chambers controlling deflection of said deflecting member, and mechanism controlled by said movable structure for effecting actuation of the fuel valve mechanism and thereafter effecting actuation of the air valve mechanism.

35. The combination with a deflecting member, a source of power, a movable structure, and a disengageable mechanical connection between said source of power and said movable structure controlled by said deflecting member, of a regenerative furnace having regenerative chambers and valve mechanisms for transferring, respectively, the fuel and air from one pair of said chambers to another pair, a device responsive to the temperature in one of said chambers controlling deflection of said deflecting member, and mechanism controlled by said movable structure for operating the fuel valve mechanism and thereafter at the conclusion of the operation aforesaid actuating said fuel valve mechanism.

36. The combination with a deflecting member, a source of power, a movable structure, and a disengageable mechanical connection between said source of power and said movable structure controlled by said deflecting member, a device responsive to the temperature in one of a plurality of chambers controlling deflecting of said deflecting member, the temperature of said chamber alternating between appreciable high and low limits and means for intermittently associating said device and deflecting member.

37. The combination with a deflecting member, a source of power, a movable structure, and a disengageable mechanical connection between said source of power and said movable structure controlled by said deflecting member, a device in each of a plurality of chambers responsive to the temperature in the individual chambers, and means for intermittently and singly associating said member with the devices to indicate the temperature in said chambers.

38. The combination with a deflecting member, a source of power, a movable structure, and a disengageable mechanical connection between said source of power and said movable structure controlled by said deflecting member, a device responsive to the temperature in one of a plurality of chambers controlling deflection of said deflecting member, a relay energized in response to predetermined movement of said movable structure, and means controlled by said relay for controlling the supply of combustion materials to said chambers.

39. The combination with a deflecting member, a source of power, a movable structure, and a disengageable mechanical connection between said source of power and said movable structure controlled by said deflecting member, a device responsive to the temperature in one of a plurality of chambers controlling deflection of said deflecting member, a relay energized in response to movement of said movable structure to predetermined position, means for maintaining said relay energized after recesssion of said movable structure from said position, and a motor controlled by said relay in turn controlling the supply of combustion materials to said chambers.

WILLIAM R. SCHOFIELD, Jr.